Dec. 7, 1926.
J. CHRISTIE ET AL
FILM SPOOL HOLDER FOR CAMERAS
Filed Sept. 21, 1923
1,610,202
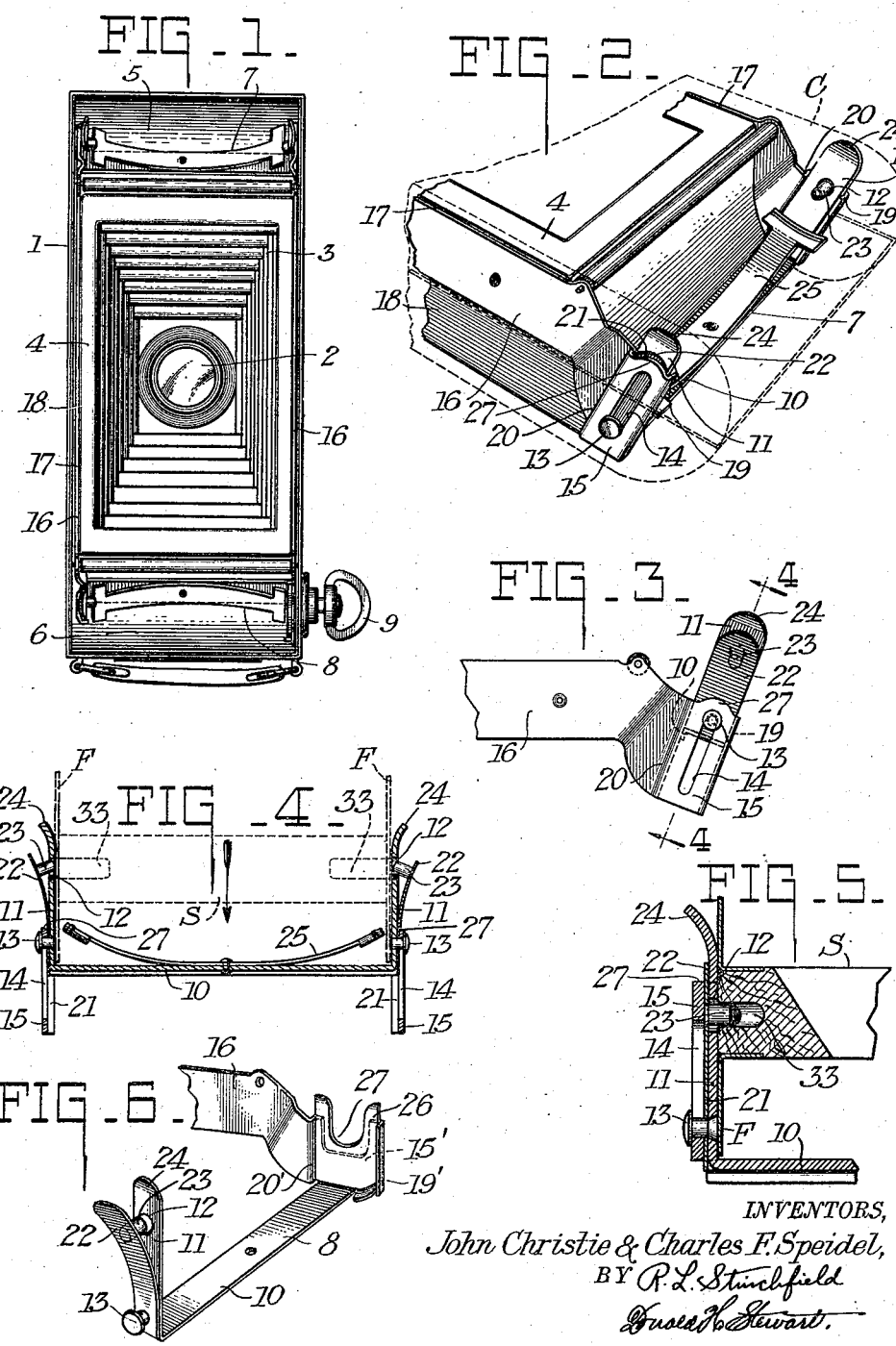
INVENTORS,
John Christie & Charles F. Speidel,
BY R. L. Stinchfield
Ursula H. Stewart.
ATTORNEYS.

Patented Dec. 7, 1926.

1,610,202

UNITED STATES PATENT OFFICE.

JOHN CHRISTIE AND CHARLES F. SPEIDEL, OF ROCHESTER, NEW YORK, ASSIGNORS TO EASTMAN KODAK COMPANY, OF ROCHESTER, NEW YORK, A CORPORATION OF NEW YORK.

FILM-SPOOL HOLDER FOR CAMERAS.

Application filed September 21, 1923. Serial No. 664,095.

This invention relates to photography and more particularly to spool-holding devices for roll film cameras. One object of our invention is to provide a spool-holding device which can be used in an extremely narrow camera. Another object is to provide a spool holder in which a spool cannot come off the trunnions when the cover is in place on the camera. Another object is to provide automatic spool-engaging devices which need not be inserted separately into the film spool ends, but which will engage and disengage the film spool automatically as the spool or holder is slid to or from the camera. Another object is to provide a holder which will keep the film convolutions properly tensioned during the sliding movement of the holders. Other objects will appear hereinafter from the following specification, the novel features being pointed out in the claims at the end thereof.

In the drawings, wherein like reference characters denote like parts throughout:

Fig. 1 is a plan view of a camera with back removed, having spool holders constructed in accordance with an embodying one form of our invention;

Fig. 2 is a perspective view of a film spool holder, parts of the camera being broken away and parts being indicated in broken lines;

Fig. 3 is a fragmentary side elevation of a holder;

Fig. 4 is a section taken on line 4—4 of Fig. 3;

Fig. 5 is a fragmentary section showing a centering pin inserted into a spool, and Fig. 6 is a fragmentary detail perspective view of the spool holder used at the winding key end of the camera.

The camera body 1 is provided with the usual lens 2, bellows 3, and exposure frame 4 with spool chambers 5 and 6 at each end thereof. A spool holder 7 is adapted to carry a supply spool of film which is wound across the frame 4 to a second holder 8 by means of the winding key 9.

The spool holders are the subject of our present invention and, as best shown in Fig. 2, holder 7 consists of a yoke 10 having turned up ends 11 apertured at 12. This member carries studs 13 slidable through slots 14 cut in guides 15. These are formed by bending the ends of the supporting strips 16 attached to the sides 17 of the camera body 18. Each support is made by bending a flange 19 at the end opposite an offset bend 20 to form a guideway or channel 21 in which one side of the yoke 11 may slide, the distance it slides being limited by studs 13 and slots 14. Each side 11 also carries a leaf spring 22 which normally moves from side 11 at the top, holding the spool centering pin 23 withdrawn from aperture 12 (Fig. 4). The ends of parts 11 are flared outwardly at 24 for convenient handles. The base 10 of the yoke carries a spring 25 for holding the film convolutions against accidental unwinding by creating the proper tension upon the outer convolution. As will be obvious, this spring presses upon the edges of an outer convolution of paper as long as a spool is retained on the pins 23, thus facilitating loading and unloading, and preventing edge fog due to accidental unwinding during these operations.

As shown in Fig. 6, spool holder 8 at the winding key end may carry an end 26 slotted at 27 to receive the film winding key web moved by handle 9 in the usual manner. Member 26 slides in a guideway 15' between flange 19' and offset 20' similar to those above described, but preferably somewhat wider. Opposite the key the centering pin construction is identical with the construction of those used on holder 7. Consequently the same reference characters are used.

The operation of our device is as follows: the holder being withdrawn for loading (as in Fig. 4), a spool S of film (only core and flanges shown in dashed lines) is inserted merely by placing flanges F between ends 11 and pushing down in direction of arrow. This causes the tops 27 of guides 15 to cam in on the springs 22 causing their pins 23 to enter the spool S, moving the holder into the position shown in Fig. 5, where the spool is firmly retained and revolubly mounted for use. The camera cover C, when in place, prevents the yoke from sliding out, so that there is no possibility of the pins being accidentally withdrawn from the spool while the camera is in use. To unload, grasp finger grips 24 and withdraw the yoke. This automatically releases the spool.

As will be apparent from Fig. 4, in loading the spool S the flanges F slide along the inside of the smooth unobstructed upturned ends 11 of the yoke, these being spaced just the necessary distance to form a guideway. As this movement takes place before yoke 10 is moved, the spool is in a position in which the pins 23 can be cammed into the properly aligned apertures 33 freely without friction. The entire loading movement—that of thrusting the spool downwardly—is therefore, smooth and easy, as the holder slides down readily into the spool chamber. Likewise the unloading can be quickly and easily accomplished by drawing out on either the handles 24 or the flanges F, the first part of the movement drawing the holder out, and the last part releasing the spool centering pins. This movement is, of course, continuous.

It should be noted that spring 25 moves with the spool carrier, thus holding the spool convolutions against unwinding up to the time the spool is released, at which time it is out of the spool chamber and can be easily handled and the usual sealing paster can be placed around the cartridge.

Having thus described our invention, what we claim as new and desire to secure by Letters Patent is:

1. A camera having a spool chamber, a yoke slidably mounted therein to move a limited distance with respect to the spool chamber, a spool centering pin cooperating with the slidably mounted yoke, and means for controlling the movement of the spool centering pin to engage and release the spool through the movement of the yoke.

2. A camera having a spool chamber, a yoke slidably mounted with relation to the spool chamber, means for supporting the yoke, spool centering pins, the pins cooperating with parts of the yoke support to automatically force the spool centering pins from a position out of contact with a spool into the spool as the yoke is moved into the spool chamber.

3. A camera having a spool chamber, a yoke slidably mounted with relation to the spool chamber, means for supporting the yoke, spool centering pins, the pins cooperating with parts of the yoke support to automatically release the spool centering pins from a spool as the yoke is withdrawn from the spool chamber.

4. A camera having a spool chamber, guideways positioned in the spool chamber, a yoke movable a limited distance in the guideways into and out of the spool chamber, a spool centering pin mounted on the yoke and movable automatically to and from an inoperative position in which the pin lies out of contact with a spool as the yoke is moved to and from a spool chamber.

5. A camera having a spool chamber, a yoke mounted therein to slide a limited distance to and from the chamber, the yoke being apertured and adapted to embrace the end flanges of a film spool, spool centering pins adapted to pass through the apertures in the yoke when the yoke is moved in one direction.

6. In a camera having a spool chamber, the combination with a yoke slidably connected to the spool chamber, being movable to and from an operative position with respect to the spool chamber, a spool centering pin carried by the yoke and movably mounted with respect thereto, and means for moving the centering pin into an inoperative position in which it does not contact with a spool by the movement of the yoke to its inoperative position.

7. In a camera having a spool chamber, the combination with a yoke slidably connected to the spool chamber, being movable to and from an operative position with respect to the spool chamber, a spool centering pin carried by the yoke and movably mounted with respect thereto, and means for releasing the spool by moving the centering pin from its operative position as the yoke is moved from its operative position in the spool chamber.

8. In a camera having a spool chamber, the combination with a spool holder, of a pin and slot connection between the spool holder and the camera, the spool holder including a yoke embracing the spool flanges, spool centering pins, springs carrying the pins and adapted to move the pins to and from a spool engaging position, the movement of the yoke relative to the camera controlling the movement of the springs.

9. In a camera having a spool chamber, the combination with a spool holder, of a pin and slot connection between the spool holder and the camera, the spool holder including a yoke embracing the spool flanges, a flexible carrier attached to the yoke, a spool centering pin attached to the carrier and adapted to be moved from a spool engaging position by the flexible carrier, the yoke causing the carrier to move the spool centering pin to a spool engaging position when the spool holder is slid into a spool chamber.

10. In a camera having a spool chamber, the combination with a guideway in the spool chamber, of a yoke slidable in the guideway, means for limiting the sliding movement of the yoke, a spring between the guideway and the yoke, a spool centering pin carried by the spring, the movement of the yoke in one direction permitting the spring to move the spool centering pin from an operative position in which it may engage a film spool.

11. In a camera having a spool chamber, the combination with a guideway in the spool chamber, of a yoke slidable in the guideway, means for limiting the sliding movement of the yoke, a spring between the guideway and the yoke, a spool centering pin carried by the spring, said spring tending to hold said centering pin out of a spool the movement of the yoke in one direction forcing the spool centering pin against the spring pressure into an operative position in which it may engage a film spool.

12. In a camera having a spool chamber, the combination with a spool holder, guides in the spool holder, a pin and slot connection between the guides and the holder permitting the latter to slide from the spool chamber for loading and unloading, and into the chamber for holding a film spool in an operative position.

13. In a camera having a spool chamber, the combination with a guideway in the spool chamber, of a yoke mounted to slide therein, a pin and slot connection between the yoke and the guideway, a leaf spring attached to the yoke and carrying a spool centering pin, the spring lying between the yoke and the guideway in such a position that when the yoke is lowered into the spool chamber the centering pin is forced into an operative spool engaging position, and when the yoke is slid on the guideway from the spool chamber the spring will withdraw the spool centering pin from contact with the spool.

14. In a camera having a spool chamber, a film spool guide slidably mounted therein and adapted to engage the flanges of a film spool, spool centering pins cooperating with the guide, said pins being automatically engaged with the spool by thrusting a spool into the guide and pressing the spool and guide into the spool chamber.

15. In a camera having a spool chamber, a film spool guiding yoke slidably mounted therein and movable to and from an operative position, spool centering pins cooperating with the yoke and movable to and from an inoperative position in which the pins are out of contact with a spool, both the yoke and the pins being moved to an operative position by thrusting a film spool into the spool chamber.

Signed at Rochester, New York, this 19th day of September, 1923.

JOHN CHRISTIE.
CHAS. F. SPEIDEL.